United States Patent [19]
Trainor

[11] Patent Number: 5,901,070
[45] Date of Patent: May 4, 1999

[54] VOLTAGE REGULATOR CONTROLLER HAVING MEANS FOR AUTOMATIC CONFIGURATION OF ACCESSORY DEVICES

[75] Inventor: John J. Trainor, Wake Forest, N.C.

[73] Assignee: Siemens Energy & Automation, Inc., Alpharetta, Ga.

[21] Appl. No.: 08/919,249

[22] Filed: Aug. 28, 1997

Related U.S. Application Data

[63] Continuation of application No. 08/497,128, Jun. 30, 1995, abandoned.

[51] Int. Cl.⁶ .................................................. G05F 1/10
[52] U.S. Cl. .............................. 364/528.33; 364/528.21; 395/284; 395/750.01
[58] Field of Search .................................... 364/483, 492, 364/131, 138, 528.21, 528.32, 528.33; 395/200.3, 200.5, 200.51, 200.52, 282, 283, 284, 285, 828, 830, 834, 750.01, 750.02, 750.03, 750.04, 750.05, 750.06, 750.07, 750.08

[56] References Cited

U.S. PATENT DOCUMENTS

| | | | |
|---|---|---|---|
| 4,794,525 | 12/1988 | Pickert et al. | 395/750 |
| 5,043,911 | 8/1991 | Rashid | 364/494 |
| 5,101,490 | 3/1992 | Getson, Jr. et al. | 395/828 |
| 5,371,743 | 12/1994 | DeYesso et al. | 395/182.08 |
| 5,428,551 | 6/1995 | Trainor et al. | 364/483 |
| 5,475,860 | 12/1995 | Ellison et al. | 395/285 |
| 5,519,634 | 5/1996 | Matsuura et al. | 364/492 |
| 5,548,782 | 8/1996 | Michael et al. | 395/828 |
| 5,553,245 | 9/1996 | Su et al. | 395/284 |
| 5,559,965 | 9/1996 | Oztaskin et al. | 395/284 |
| 5,560,022 | 9/1996 | Dunstan et al. | 395/282 |

*Primary Examiner*—Eric W. Stamber

[57] ABSTRACT

A voltage regulator controller having a means for automatic configuration in response to accessory devices is taught. Briefly stated, voltage regulator controller has a backplane which allows for interfacing with a plurality of accessory type modules such as communications modules, I/O modules and the like. The voltage regulator controller interrogates this bus and hence the accessory devices attached thereto and automatically configures the accessory devices found and activates appropriate handling algorithms for each device found.

29 Claims, 3 Drawing Sheets

VOLTAGE REGULATOR CONTROLLER HAVING MEANS FOR AUTOMATIC CONFIGURATION OF ACCESSORY DEVICES

This is a continuation of Ser. No. 08/497,128 filed on Jun. 30, 1995, now abandoned.

FIELD OF THE INVENTION

This invention relates, generally, to voltage regulator controllers and more particularly to a system for handling a plurality of accessory expansion type devices in a voltage regulator controller, such accessory devices including rack mount communication modules, I/O modules and the like which are automatically configured upon their interconnection with the voltage regulator controller.

BACKGROUND OF THE INVENTION

Voltage regulators have been in existence and use for quite some time. It is known that they are a necessary part of any efficiently operated power distribution network or grid system, particularly when inefficient operation can result in significant lost revenue or maintenance problems.

As such, voltage regulators are being used with increasing frequency. Since they are such an important part of a modern distribution system there is an increasing need and desirability for providing remote as well as more sophisticated operation and monitoring of these voltage regulators as well as interconnection of voltage regulators via their controllers in order to accomplish this.

Heretofore, whenever options, accessories, features and the like have been utilized with voltage regulator controllers, such options, accessories and features are typically factory installed. There, any configuration specific items for handling these additional devices was done in the factory and required specialized installation procedures as well as different program loads for differently configured controllers. Some configuration options were even set via DIP Switches on an expansion board.

However, even if changes or additions to the voltage regulator controller (and hence the voltage regulator) were done in the field, it was frequently necessary to completely reconfigure the voltage regulator controller which typically required that the voltage regulator itself be taken out of service. This is proven to be not only inconvenient but expensive. Additionally, it also required trained technicians to install, delete or modify the accessory devices. Further, equipment changes also required particular tools, instructions and time. Moreover, and perhaps most importantly, configuration and reconfiguration was more error prone since it relied on proper placement of DIP Switch settings, proper software changes, physical and electronic installation and the like.

OBJECTS AND SUMMARY OF THE INVENTION

Accordingly, it would be advantageous and it is an object of the present invention to produce a voltage regulator controller which allows for the use of simple rack-mount expansion accessory devices which do not have to be factory installed. Yet another object of the present invention is to produce a voltage regulator controller which does not require special tools or highly trained technical personnel in order to install accessory devices. A further object is to produce a voltage regulator controller which requires minimal time in order to install and configure an accessory device to operate with a specific voltage regulator controller.

Still another object of the present invention is to produce a voltage regulator controller which allows for accessory devices to be interchanged between regulator controllers and automatically reconfigured upon being interchanged. Yet another object of the present invention is to produce a voltage regulator controller which automatically checks for installed accessory devices, configures the installed device or devices and automatically activates the handling algorithms or protocols for these devices thereby allowing the accessory device to communicate with and use the voltage regulator controller.

Yet another object of the present invention is the ability to have a user order a basic voltage regulator controller whereby the user may thereafter purchase and install expansion accessory devices at any desired time without necessarily taking the voltage regulator off-line or any special handling. Yet another object of the present invention is to allow a user to exchange accessory equipment amongst different voltage regulator controllers or to install special accessory devices as the need arises.

Still a further object of the present invention is to have a voltage regulator controller which automatically configures each expansion accessory device with pre-defined configuration data.

A further object of the present invention is to produce a voltage regulator controller base unit which does not require more accessory or expansion devices than are necessary at the time of the controller's initial installation. Yet another object of the present invention is to produce a voltage regulator controller wherein upon installation of an accessory device, accessory device algorithms are not activated if that particular device type is not found within a library list found within the voltage regulator controller memory.

Yet another object of the present invention is to produce a voltage regulator controller for a voltage regulator and having automatic configuration of an accessory device, comprising a controller having a main processor therein, the main processor having at least an I/O section and a peripheral interface section for communication with at least one accessory device, an accessory device electrically connectable to the controller, the accessory device having an accessory device processor therein and having at least an I/O section and a peripheral interface section for communication with the main processor, wherein the main processor interrogates the accessory device processor and configures the accessory device according to a predetermined scheme.

It is still a further object of the present invention to produce a method of configuring an accessory device upon electrical connection to a voltage regulator controller, wherein the accessory device and the voltage regulator controller each have a processor having an I/O section and a peripheral interface section, comprising the steps of first, initialization of the accessory device processor by the voltage regulator controller processor and second writing configuration data transmitted by the voltage regulator controller processor to the accessory device processor such that the accessory device operates according to a predetermined scheme.

BRIEF DESCRIPTION OF THE DRAWINGS

Reference may be now had to the accompanying drawings in which.

DETAILED DESCRIPTION OF THE PREFERRED EMBODIMENT

Figure 1:
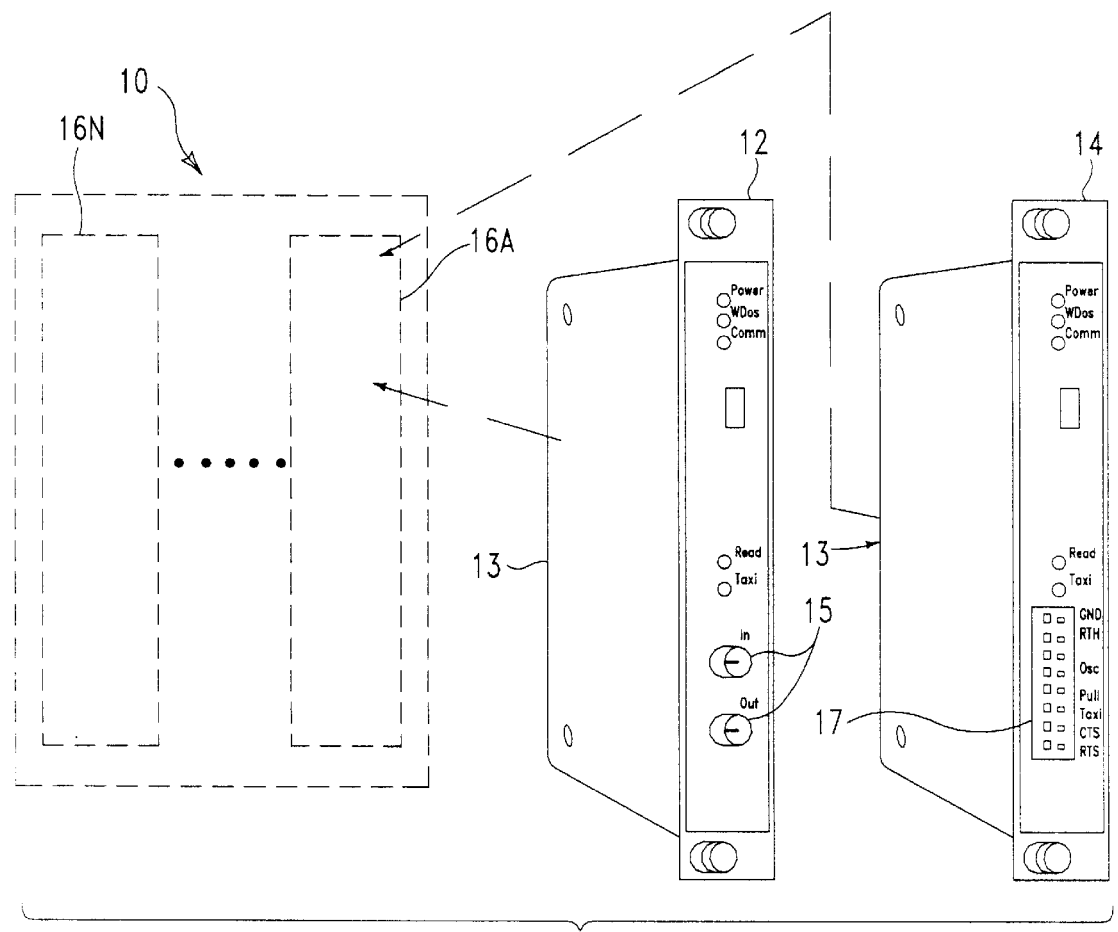
FIG. 1 shows two exemplary accessory devices in relation to how they are interconnected to a voltage regulator controller housing.

Reference may be now had to FIG. 1 which is a representative diagram showing interconnection of an accessory device to a voltage regulator controller according to the present invention. It is to be understood that voltage regulators are readily known and understood by one in the art, an example of which may be found in U.S. Pat. No. 5,428,551 issued Jun. 27, 1995 to LaPlace, et. al. and assigned to the same assignee as the present invention and which is specifically incorporated by reference herein. Accordingly, a detailed description will not be given. However, voltage regulator controllers typically, monitor, record and operate voltage regulators, tap changers and the like.

Shown adjacent to voltage regulator controller 10 are exemplary accessory devices 12, 14 which are rack-mount communication modules which facilitate communication between the voltage regulator controller and external devices (i.e., other modules, data networks, other controllers and the like) and are fiber-optic and wire-based communication modules respectively. In this regard, fiber optic communication module 12 interacts through fiber optic connectors 15 while similarly, wire based RS/232 accessory module 14 interacts through wire based terminals shown generally at 17. It is submitted that interconnection of devices and communication via RS-232 or fiber optic media are readily known and available to one skilled in the art and therefore a further detailed description will not be had.

Disposed on the back of each rack mount accessory module 12, 14 are appropriately positioned back plane connectors 13 (not shown) which are readily known and available to one skilled in the art. It is submitted that a great many other types of accessory devices may be utilized without departing from the spirit and scope of the present invention. Such devices may include power monitoring, fault monitoring, data logging.

Accessory modules 12, 14 cooperate with voltage regulator controller and enclosure 10 shown in phantom (hereafter referred to as enclosure 10). As part of each enclosure 10 are a plurality of accessory position apertures 16a through 16n which may accommodate a number of accessory devices. This number may vary according to the users needs, being effectively limited only by the physical size of enclosure 10. In this fashion, different types of accessory devices may be interconnected to the regulator controller without departing from the spirit and scope of the present invention.

Figure 2A:
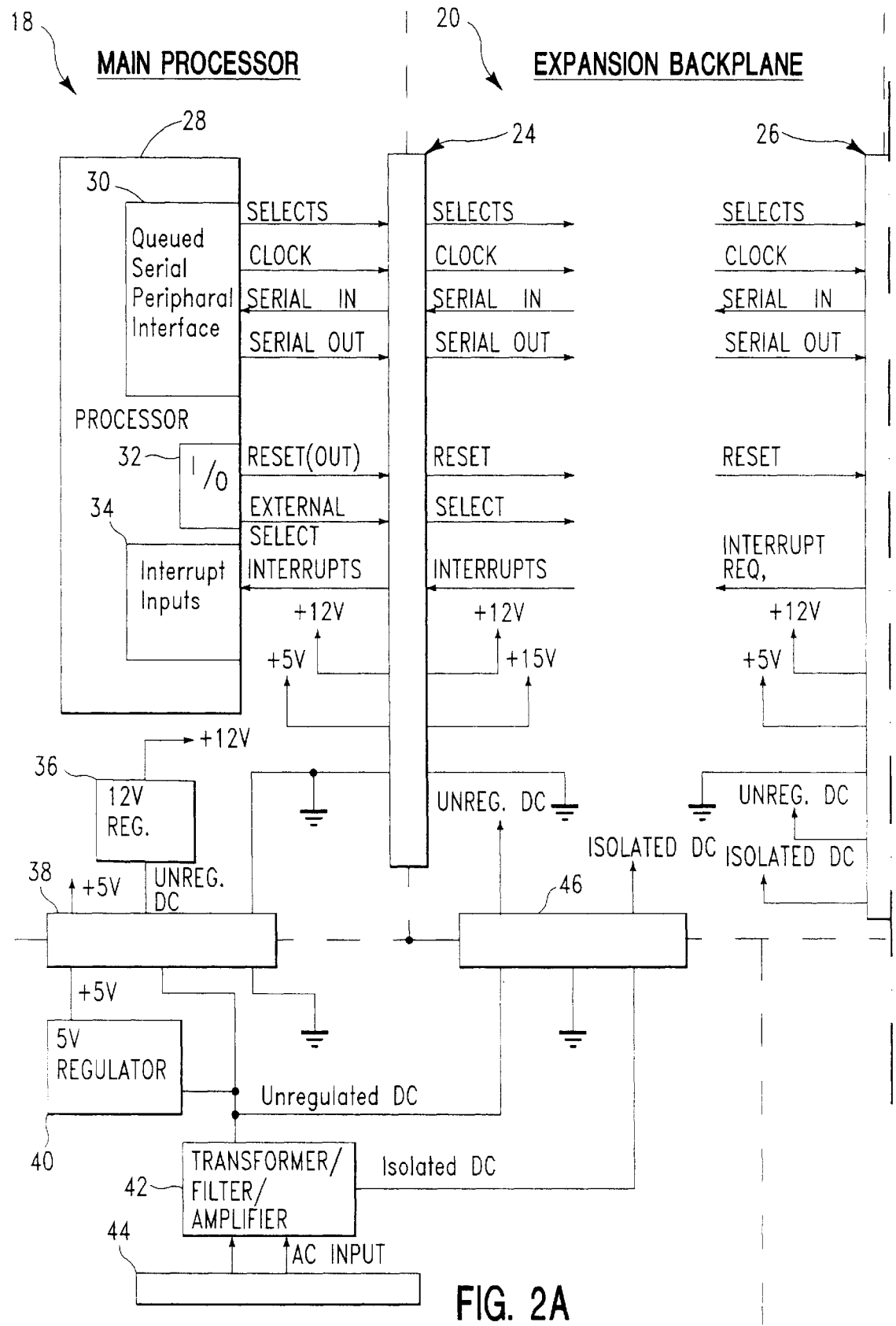
FIG. 2 is a block diagram of the processors and communications scheme associated between the voltage regulator controller and a communication module as well as the expansion back plane therebetween.
Figure 2B:
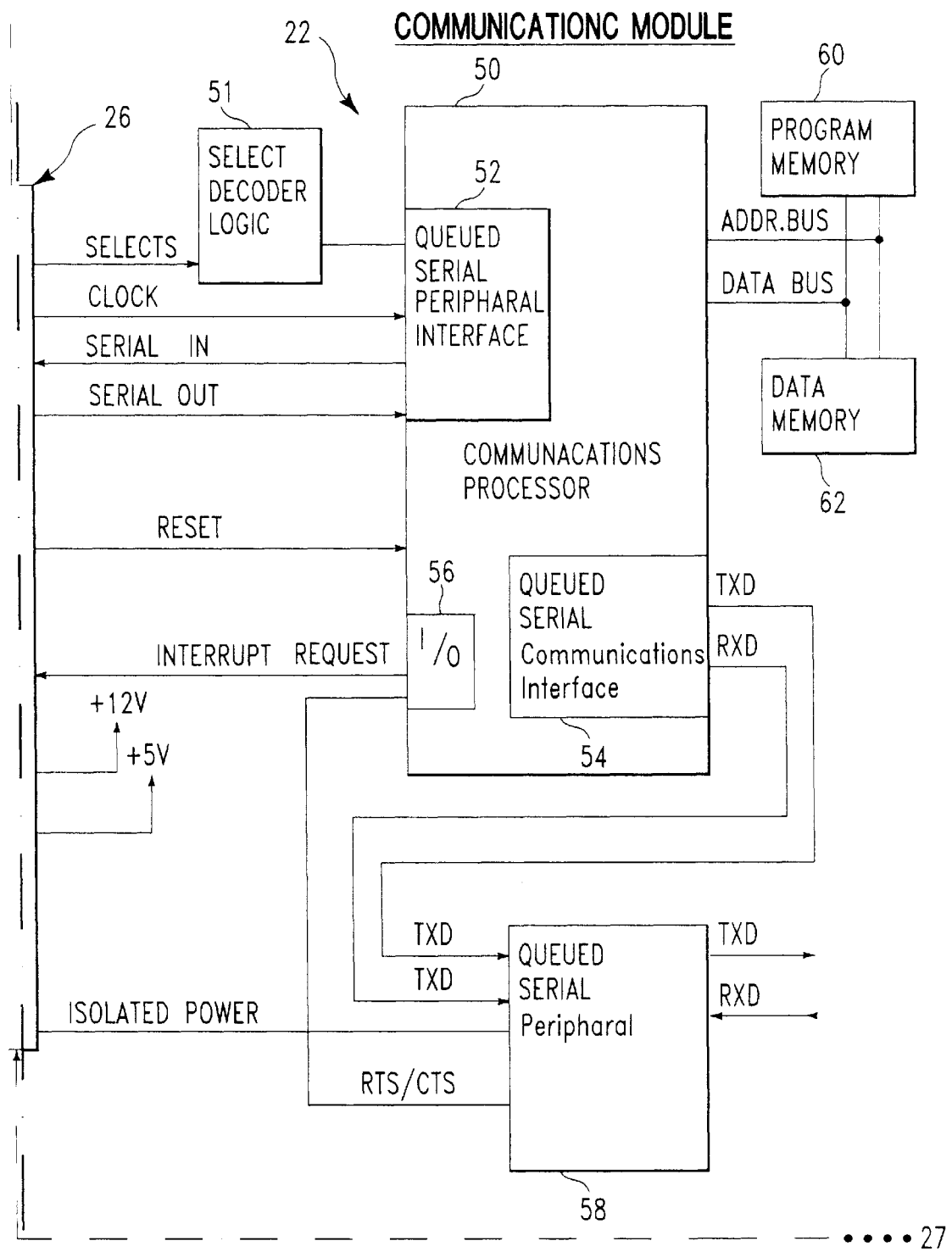
Figure 2:
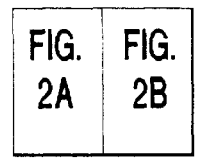

Referring now to FIG. 2 there is shown a block interconnect diagram between the components contained within a voltage regulator controller and enclosure 10 and an exemplary accessory device such as communication modules 12, 14. Accordingly, it can be seen that the voltage regulator controller is comprised of a processor section 18 with the regulator controller having a base unit which is referred to herein as a main processor 28. In the preferred embodiment of the present invention the main processor 28 runs the algorithm (discussed more fully below) that implements expansion accessory handling according to the present invention.

Main processor 28 is comprised of a QUEUED serial peripheral interface 30, an I/O portion 32, and interrupt/input section 34. In the preferred embodiment of the present invention main processor 28 is preferably a Motorola 68HC16 processor. Generally, the function of the main processor 28 is to exchange data with accessory modules. As can be seen, main processor 28 communicates over a plurality of signal lines through expansion connector 14 and onto an expansion backplane shown generally at 20. It is to be understood that expansion backplane 20 allows for a plurality of accessory devices to be interconnected thereto and in this fashion is akin to expansion backplanes used in computers.

Disposed along expansion backplane 20 are a plurality of I/O or accessory module connectors such as 26. This therefore allows for accessory devices to be coupled and decoupled from the back plane and hence the processor section 18 of voltage regulator controller in a rack-mount or other suitable configuration.

It is to be remembered that although in one embodiment of the present invention, a communications module 22 is shown, other types of accessory devices such as data loggers may be utilized without departing from the spirit and scope of the present invention. Such devices may include but not be limited to discrete I/O modules or analog I/O modules.

Shown generally as part of communication module 22 is an accessory device processor 50 (hereinafter referred to as communication module processor 50). Processor 50 has contained therein a QUEUED serial peripheral interface 52 which as can be seen is made to cooperate with the QUEUED serial peripheral interface (QSPI) 30 contained in main processor 28. Also disposed within communications processor 50 are a communications interface 54 as well as an I/O port 56. Interconnected with communications processor 50 is Select Decoder Logic shown generally at 51 as well as program memory and data memory 60, 62 which cooperate with address and data buses as appropriate and as are readily known to one skilled in the art.

Further interconnected to processor 50 is a physical link interface 58. In the preferred embodiment of the present invention, a physical link interface specifically provides for communications into and out of communication module 22 and converts it into the appropriate medium format (i.e. fiber optics such as the fiber optic communication module 12 or a wire output such as RS-232 module 14). Additional physical link interfaces may be in the form of radio frequency, infrared and the like without departing from the spirit and scope of the present invention.

Powering the main section 18 as well as communications module 22 is an expansion power bus 27. Expansion power bus 27 is energized by a power supply. This power supply is composed of a transformer/filter-rectifier 42 which produces a plurality of regulated and unregulated DC outputs as desired. However, it is to be understood that other types of power supply configurations and outputs may be utilized without departing from the spirit of the present invention.

Transformer 42 receives its power from a polarized disconnect 42 in the form of AC power. Thereafter, voltage regulators 36 and 40 produce 12 and 5 volt outputs respectively via operating power bus connector 38. Similarly, operating power bus connector 46 is utilized to provide additional power through a connector to the present invention. In this fashion, the expansion back plane 20 via expansion connector 24 and I/O module connectors 26 are appropriately energized to supply the necessary power according to the present invention. However, it is to be understood that other ways of distributing power may be utilized without departing from the spirit and scope of the present invention.

GENERAL FUNCTIONAL OVERVIEW

The voltage regulator controller processor 28 of the present invention (hereafter referred to as the "Main Processor" or "MP") runs an algorithm that implements the expansion accessory handling system or algorithm. The main processor 28 includes an Interprocessor Communications (IPC) task that implement the expansion accessory handling system.

The Main Processor IPC task is implemented as a single task plus interrupt service routines via the QUEUED Serial Peripheral Interface (QSPI) Interrupt Service Routine (ISR), and a Handshake Interrupt Service Routine(s) (HISR) (although the handshake interrupt service routine may not be used for all Expansion Accessory Devices). The Main Processor IPC task includes the following processes: Initialize the Expansion Accessory Device (EAD), Write Data (to the EAD), and Handle Received Messages (from EAD).

In an attempt to provide an overview of the preferred embodiment, an exemplary implementation for handling an accessory device such as Communications Module 22 is described below. Accordingly, other Expansion Accessory Devices may utilize similar processes which are adapted to that particular device. Such processes include:

1. Initialization of the Accessory Device;
2. Writing Data to the Accessory Device;
3. Handling Accessory Device to Main Processor Messages;
4. QSPI Interrupt Service Routines; and
5. Accessory Device Handshake Interrupt Service Routines.

Initialization of an Accessory Device

This process performs the interprocessor communications and communication module initialization functions. This process determines if there is an Accessory Device such as a communication module present. If an accessory device is present, this process sends the device initialization data as well as Accessory Device internal configuration items or criteria.

The process is started after reset and after an Initialize Request message is received from the accessory device. When an Initialize Request Message is received, the QSPI Interrupt Service Routine sets a flag to activate the Initialize accessory device (i.e. Communications Module) task.

Writing Data to the Accessory Device

This process delivers the accessory device (i.e. communications-object) data to the accessory device. This process converts the object data from a Main Processor Memory Manager format into the QSPI data link format. This process breaks down the overall object data transfer into several manageable fragments.

Handling Accessory Device to Main Processor Messages

This process handles messages from the accessory device. Its primary task is to update the Main Processor Memory Manager based on write and reset commands received via the accessory device. This task also processes other accessory device to Main Processor messages, such as Initialization Requests.

QSPI Interrupt Service Routines (ISR)

The QSPI Interrupt Service Routine supports interprocessor communications. This interrupt service routine gets called when the Main Processor's QSPI completes a data block transfer to the accessory device. Within the QSPI Interrupt Service Routine, the Main Processor to Accessory Device handshake interrupt is enabled.

The QSPI Interrupt Service Routine also checks for messages from the accessory device. If it detects a valid Accessory Device to Main Processor write message, the QSPI Interrupt Service Routine copies the received message to a buffer and sets a flag to alert the Process Accessory Device to Main Processor Message process.

Accessory Device Handshake Interrupt Service Routines

The Accessory Device Handshake Interrupt Service Routine (HISR) supports interprocessor communications. This ISR further disables Accessory Device Handshake interrupt requests although the Accessory Device Handshake interrupt request is re-enabled in the QSPI interrupt service routine. This HISR sets the "CM Handshake" flag. If this flag gets set while Main Processor was not sending data to the Accessory Device via the QSPI, it indicates that the Accessory Device is requesting the Main Processor's attention. The Accessory Device requests the Main Processor's attention when it is attempting to send a message to the Main Processor. Since the Main Processor is the QSPI master, the Accessory Device must first get the Main Processor attention. The Main Processor will then read the message pending from the Accessory Device.

Accordingly, found below is an exemplary programming process in pseudocode for a Communications Module (CM) such as modules 12,14 found the above FIG. 1 and described above.

EXAMPLE 1

Main Processor Interprocessor Communications- Pseudocode

CM Task

```
Initialize CM
if (CM present)
    Loop (forever):
        write objects (excluding log data) to CM
        write interval log data to CM (if it has changed)
        write event log data to CM (if it has changed)
        process CM to Main Processor messages
    else
        deactivate CM Task
```

Initialize CM

```
prepare cm initialization packet (includes primary
configuration data)
for (i = 0; CM RETRY LIMIT; i++)
    wait for loop delay
    send hardware reset to CM
    wait for reset to complete
    send init packet to CM
    wait delay time for response
    check for response from CM
    if (CM INIT RESPONSE)
        send additional initialization data
        set flag "CM Present"
        break out of for loop
```

Write Objects (excluding log) to CM

Convert Main Processor memory manager data to QSPI
  transfer objects
format QSPI transfer objects with header & checksum
transfer Main Processor write data to CM (Activate QSPI
  Interrupt)

Update CM Interval Log (Incremental)

if (new interval log records accumulated)
  Convert Main Processor log data to QSPI transfer
    objects
  format QSPI transfer Objects with header & checksum
  transfer Main Processor write log data to CM
    (Activate QSPI Interrupt)

Details of Data Transfer from Main Processor to CM

Send data packet to CM
Start acknowledge/ not-acknowledge (ACK/NACK)
  Timeout timer
if ACK received
  de-activate & clear timer
  Clear no-response retry count
  Clear NACK-response retry count
if NACK received
  Re-send data packet to CM
  Re-start ACK/NACK Timeout timer
  Clear no-response retry count
  Increment NACK-response retry count
if Timeout occurred
  Re-send data packet to CM
  Re-start ACK/NACK Timeout timer
  Increment no-response retry count
if No-Response or NACK-Response Retry Counters=
MAX VALUEs
  set flag "CM Not Responding"

QSPI Interrupt Service Routine

Clear QSPI interrupt
Enable CM handshake interrupt signal
set flag "QSPI DONE"
Check for valid receive message (from CM to Main
  Processor)
if (valid receive message)
  save message in buffer
  set flag "QSPI RECEIVE"
return

DETAIL OF OPERATIONS

As previously indicated, the microcontroller of the Main Processor 28 is preferably a Motorola 68HC16 processor and is used to exchange data with expansion rack option modules using its Queued Serial Peripheral Interface 30 (QSPI). The Communications Module 22 also runs a similar microcontroller, and communicates with the Main Processor using its Queued Serial Peripheral Interface 30.

The Queued Serial Peripheral Interface 30 signals (along with two interrupt lines, the reset signal, an additional address line, and power) comprise the (serial) expansion bus interface. The serial expansion bus provides the physical link for communications between the Main Processor 28 and the Expansion Rack option modules.

The Main Processor 28 serves as the expansion bus master. When an option device has data to transfer to the Main Processor, it interrupts the Main Processor and then waits for the Main Processor to send a polling message. When the Main Processor sends the polling message, the option device transfers its data using the full-duplex feature of the expansion bus link. The expansion bus interface provides two interrupt (IRQ) signals. One signal (IRQCM) is dedicated for Communications Module 22 use. The other signal (IRQ) is used for all other expansion rack option devices.

Communications Module to Main Processor exchanges occur for write messages on the Communications Module Comm link and for Communications Module requests. If the Main Processor is sending data to the Communications Module 22, the Communications Module 22 uses the full duplex capability of the Queued Serial Peripheral Interface 52 link to send its message to the Main Processor. If the Main Processor is not sending data, then the Communications Module 22 alerts the Main Processor via the dedicated interrupt line (the Main Processor IRQCM input) before data transfer can take place.

Queued Serial Peripheral Interface Link Protocol Overview

The Queued Serial Peripheral Interface 30 link protocol utilizes the full duplex capability of the underlying microcontroller Queued Serial Peripheral Interface 30 physical link to maintain maximum throughput. In the preferred embodiment of the present invention, the Queued Serial Peripheral Interface 30 link has a low bit error rate, the Queued Serial Peripheral Interface 30 link protocol limits error checking to a 16-bit checksum at the end of every packet.

The microcontroller Queued Serial Peripheral Interface 30 handles serial data traffic for both the Communications Module 22 and the Main Processor. Since the Queued Serial Peripheral Interface 30 generates a receive interrupt request only when the receive queue is completely full, it is preferred (but not required) to send full (queue) length messages for every Queued Serial Peripheral Interface transmission session. The Main Processor always sends 16 words (each 16 bits long) for Main Processor to Communications Module transmission. Message "packets" always consist of 16 words of data.

In the preferred embodiment of the present invention, the Main Processor 28 is the Queued Serial Peripheral Interface 30 bus master while the Communications Module 22 is a Queued Serial Peripheral Interface bus slave. Conceptually, more data is transferred from Main Processor to Communications Module processor rather than from Communications Module processor to Main Processor.

The Communications Module 22 stuffs the first word of its transmit queue with a null message command. When the Main processor sees this null message command in the first word, it ignores the message. Accordingly, when the processor has a write message to send, it loads the write command (consisting of the command nibble and operand) into the first word of the queue, along with the remainder of the message. When the Main Processor completes its message packet transmission, it checks its receive queue. If the command word is not a null message command, then the Main Processor calculates the checksum. If the checksum is valid, the Main Processor saves the message packet and sets a semaphore indicating that there is a Communications Module to Main Processor message in the Main Processor receive message buffer.

When the Main Processor decodes the Communications Module to Main Processor packet and executes the command, the Main Processor sets the acknowledge (ACK) field to the value determined by the decode process. On the subsequent Main Processor to Communications Module write, the Main Processor transfers the new value of the ACK field. Depending on the contents of the ACK field, the Communications Module processor determines what data to load into its transmit queue in preparation for sending another message.

Timing

The Communications Module processor acknowledges each Main Processor data transfer. When the Communications Module's Queued Serial Peripheral Interface receiver captures a complete packet (becomes full), it will cause a Queued Serial Peripheral Interface receive interrupt. The Communications Module processor checks the checksum and if valid copies the receive queue data to a local storage buffer for later processing. After storing the Queued Serial Peripheral Interface received data, the Communications Module strobes the (IRQCM) handshake line.

Concurrently, the Main Processor prepares its next message for transmission. The Main Processor waits to receive an acknowledge strobe on the IRQCM handshake line before sending its next message packet. For Communications Module processor to Main Processor writes, the Communications Module writes the 16-word packet to its transmit queue during its Queued Serial Peripheral Interface-receive interrupt service routine.

Should the Main Processor detect a checksum error, it ignores the Communications Module message. If the Main Processor fails to receive the Communications Module processor to Main Processor message, then it will not send a process acknowledge/not-acknowledge (ACK/NACK) signal. The Communications Module Write to Main Processor process has a built-in time-out period during which it waits for an ACK/NACK. If the Communications Module processor fails to receive an ACK/NACK in the allotted time-out period, then the Communications Module processor repeats the message.

Communications Module ACK of Main Processor Transfers

The Communications Module 22 acknowledges Main Processor to Communications Module processor transfers using the interrupt request (IRQCM) signal. When the Communications Module processor receives a packet with a good checksum, it asserts the IRQCM signal momentarily.

The Main Processor waits a pre-defined time period for the IRQCM pulse. If the Main Processor does not see a pulse, it assumes that the Communications Module processor did not receive an intact packet. The Main Processor can either re-send the packet, or continue with a subsequent packet, depending on the desired pre-defined protocol.

Main Processor ACK of Communications Module Transfers

When the Main Processor decodes a Communications Module processor to Main Processor packet and executes the command, the Main Processor loads the ACK field with status information. Thereafter, the Main Processor stuffs the ACK field with two status nibbles: the upper nibble is the 'system' status, and the lower nibble is the 'data' status.

During a subsequent Main Processor to Communications Module processor write, the Main Processor transfers the new value of the ACK field. Depending on the contents of the ACK field, the Communications Module processor determines what data to load into its transmit queue in preparation for sending another message.

Overview of Queued Serial Peripheral Interface Link Message Packeting

| Queued Serial Peripheral Interface Link Message Format | | |
|---|---|---|
| Command (4 bits) | Operand (12 bits) | word 1 |
|  | Status | word 2 |
| ACK field (8 bits) | Qualifier (8 bits) | word 3 |
|  | Data (12 words) | words 4–15 |
| Checksum | (2's complement of words 1–15) | word 16 |

MAIN PROCESSOR COMMANDS

Main Processor Command Code 1: Main Processor to Communications Module Write (Non-Log Data)

| Main Processor TO Communications Module WR | Starting Variable ID | word 1 |
|---|---|---|
| No. of Active Data words (4 bits) | Bit Mapped Data Status Valid/Invalid (12 bits) | word 2 |
| ACK field (8 bits) | Not used (don't care) | word 3 |
| Data = | up to 12 consecutive data words starting at above Variable ID | words 4–15 |
| Checksum | (2's complement of words 1–15) | word 16 |

Main Processor Command Code 2: Main Processor to Communications Module Write Log

| Main Processor TO Communications Module WR LOG | Log Packet Type | word 1 |
|---|---|---|
|  | Log 16-bit sequence number | word 2 |
| ACK field (8 bits) | Log pointer number (1 to 100) | word 3 |
| Data = | Pre-defined data contents per Log Packet Type | words 4–15 |
| Checksum | (2's complement of words 1–15) | word 16 |

The status field contains a 16-bit log sequence number for this packet of log data. This sequence number uniquely identifies an interval or event log record. The Log Packet Type field defines whether the packet contains interval log or event log data.

The Log Packet Type defines which set of log information is being transferred. Since interval log records are too large under the present scheme to send in a single packet, it is broken up into multiple packets. Accordingly, the table below summarizes the data contents for each Log Packet Type.

| Log Packet Type | Value (hex) | Packet Data Contents |
|---|---|---|
| Interval 1 | 01 | Data Object Type-Points |
| Interval 2 | 02 | Data Object Type-Points |
| Interval 3 | 03 | Data Object Type-Points |
| Event 1 | 10 | Data Object Type-Points 11–18 (11 total) |

With packets of less than 12 data objects, the balance of the data field consists of don't cares.

Main Processor Command Code 3: Write Function

| WRITE FUNCTION | Write Function Operand | word 1 |
|---|---|---|
| 0 (zero) | 0 (Zero) | word 2 |
| ACK field (8 bits) | Not used (don't care) | word 3 |
| Data = | (don't care) | words 4–15 |
| Checksum | (2's complement of words 1–15) | word 16 |

Main Processor Command Code 5: Hardware Reset

| HARDWARE RESET | 0 (zero) | word 1 |
|---|---|---|
| Status = | FADE (hex) | word 2 |
| ACK field (don't care) | Qualifier = don't care | word 3 |
| Data = | don't care | words 4–15 |
| Checksum | (2's complement of words 1–15) | word 16 |

This command can be sent by either the Communications Module processor or by the Main Processor. The receiving processor implements a hardware reset by disabling further writes to the watchdog timer.

Main Processor Command Code 8:
Communications Module Present Inquiry

| Communications Module PRESENT INQ **Bit mapped request for self-tests | | word 1 |
|---|---|---|
| Status = 0 | | word 2 |
| ACK field = 0 | Qualifier = don't care | word 3 |
| Data = comm protocol | | word 4 |
| Data = comm baud | | word 5 |
| Data = comm parity | | word 6 |
| Data = comm addr | | word 7 |
| Data = comm pre tx (rts delay) | | word 8 |
| Data = comm post tx (rts delay) | | word 9 |
| Data = comm dnp tx delay | | word 10 |
| Data = comm retry (DNP retry count) | | word 11 |
| Data = (Valid) Type Map | | word 12 |
| Data = don't care | | words 13–15 |
| Checksum (2's complement of words 1–15) | | word 16 |

Overview of Main Processor Command Code 9:
Load Comm Module Configuration

Main Processor Command Code A: Begin Initialization

| BEGIN INIT | 0 (zero) | word 1 |
|---|---|---|
| | Status = 0 | word 2 |
| ACK field | Qualifier = don't care | word 3 |
| | Data = don't care | words 4–15 |
| Checksum | | word 16 |

The Main Processor sends this message when it wants to re-initialize the Communications Module's processor configuration and log data. The Main Processor may send this message in response to an "Initialization Request" message from the Communications Module 22, or because it found an error in the Communications Module's processor "Initialization Complete Response" message.

Main Processor Command Code B: Initialization Complete

| INIT COMPLETE | 0 (zero) | word 1 |
|---|---|---|
| | Status = 0 | word 2 |
| ACK field | Qualifier = don't care | word 3 |
| | Data = don't care | words 4–15 |
| Checksum (2's complement of words 1–15) | | word 16 |

OVERVIEW OF COMMUNICATIONS MODULE COMMANDS

Communications Module Command Code 1:
Communications Module to Main Processor Write
(Non-Log Data)

| Communications Module TO Main Processor WR | Variable ID | word 1 |
|---|---|---|
| 0 | 0 | word 2 |
| ACK field (8 bits) | Not used (don't care) | word 3 |
| | Data = value for above Variable D | word 4 |
| | Data = don't care | words 5–15 |
| Checksum | (2's complement of words 1–15) | word 16 |

Communications Module Command Code 6:
Communications Module to Main Processor Object Reset

| OBJECT RESET | Variable ID | word 1 |
|---|---|---|
| | Status = 0 | word 2 |
| ACK field (8 bits) | Not used = don't care | word 3 |
| | Data = don't care | words 4–15 |
| Checksum | (2's complement of words 1–15) | word 16 |

This command causes the Main Processor to reset the data object whose identifying variable ID is provided in the message. In the preferred embodiment of the present invention, the definition of the term "reset" differs for different data objects. For some data, resetting causes the data to be zeroed. For other data objects (specifically minimums and maximums), the data objects are loaded with the value of a different parameter. For example, resetting the Vsource Forward Maximum object would cause it to be loaded with the Vsource Forward (instantaneous) value.

Command Code 7: Communications Module to Main Processor Master Object Reset

| | | |
|---|---|---|
| MASTER RESET Status = AA55 (hex) | 0 (zero) | word 1 word 2 |
| ACK field (8 bits) Data = Don't care | Not used (don't care) | word 3 words 4–15 |
| Checksum (2's complement of words 1–15) | | word 16 |

This command causes the Main Processor to reset all of its master-resettable data objects.

Communications Module Command Code 8: Communications Module Present Response

| | | |
|---|---|---|
| Communications Module PRESENT RESP | *Same as value in Communications Module PRESENT INQUIRY | word 1 |
| bit mapped results of self-tests** | Communications Module Response Status | word 2 |
| ACK field | Qualifier = don't care | word 3 |
| | Communications Module SW REVISION | word 4 |
| | Communications Module HW REVISION | word 5 |
| | Communications Module MASK LEVEL | word 6 |
| | IO BOARD TYPE | word 7 |
| | Communications Module OPTIONS | word 8 |
| | IO BOARD REVISION | word 9 |
| QSPI Bad Checksum | QSPI Missed Types | word 10 |
| QSPI Failed Writes | QSPI Xfer Cycles | word 11 |
| Not Used | DNP Unsupported Requests | word 12 |
| RAM Error Address Location: | High Word | word 13 |
| RAM Error Address Location: | Low Word | word 14 |

Command Code B: Initialization Complete Response

| | | |
|---|---|---|
| INIT COMain Processor L RESP | 0 (zero) | word 1 |
| Status = | 0 | word 2 |
| ACK field | Qualifier = don't care (hex) | word 3 |
| Number of Event | Records received | word 4 |
| Number of | Records received | word 5 |

| | | |
|---|---|---|
| Interval Remaining Data = | don't care Checksum | word 6–15 word 16 |

The Communications Module processor sends this message in response to the "Initialization Complete" message from the Main Processor. The Main Processor can then check that the number of event and interval records received are correct.

Command Code E: Initialization Request

| | | |
|---|---|---|
| INIT REQUEST | 0 (zero) | word 1 |
| Status = | 0 | word 2 |
| ACK field | Qualifier = don't care | word 3 |
| Data = | don't care Checksum | words 4–15 word 16 |

The Communications Module 22 sends this message when it wants to have its configuration data re-initialized. When it receives and executes this initialization request, the Main Processor forces a Communications Module processor reset, then reloads the Communications Module configuration data.

Implementation of the Queued Serial Peripheral Interface Link Protocol

Log Data Transfer and Maintenance

The Main Processor sends a 16-bit log sequence number along with each log record. In addition, the Main Processor sends its internal pointer value (with range of 1 to 100) for each log record. For an individual record, the interval log data is sent in three consecutive packets. Each event log record is sent in a single packet. The Main Processor can maintain the event and interval log data records in a variety of ways.

Further, the Communications Module processor software can be implemented so that it does not exactly duplicate the log contents of the Main Processor. Therefore, log transfers can be implemented as follows: At power up (or upon Communications Module processor Init request), the Main Processor sends its complete log contents to the Communications Module 22. At that point, the Communications Module processor log record is identical to that of the Main Processor. Whenever new log data is recorded at the Main Processor, the Main Processor sends the new log record to the Communications Module processor. When log records are deleted from the Main Processor, the Main Processor does not inform the Communications Module processor of this change. When the Main Processor reaches, for example, 100 log records (of one type or the other), it starts to discard its oldest records when new ones occur. The Communications Module processor would not need to discard old records until its capacity of, for example, 200 records is reached.

Alternatively, Communications Module processor does not need to use the "pointer" method employed on the Main Processor for accessing log records, since it can store and access the records according to their sequence numbers. This allows greater freedom for implementing log storage and retrieval on the Communications Module. For example, the log object specification for retrieving log records of each type (i.e. event and interval) can be defined so that they can be accessed directly, without using the pointer mechanism of the Main Processor as mentioned.

Log Data—Communications Module Storage as a Main Processor Replica

The Communications Module processor memory 62 can store the log data as an exact replica of the Main Processor log data. Whenever the Main Processor gains a new log record, it updates the Communications Module with the new record information. Whenever an operator deletes a Main Processor log item, the Main Processor sends a message to the Communications Module 22 to delete its carbon copy of that log record. If the operator clears the Main Processor log, the Main Processor commands the Communications Module 22 to clear its log. Periodically, (e.g., once per day), the Main Processor downloads the complete log information to the Communications Module 22.

Should the above approach be desired, it is necessary for the Main Processor to Communications Module processor write function to be added. These "Delete Log Record" write function would allow the Main Processor to delete a single Communications Module log record. Accordingly, such log transfers can be implemented as follows: At power up (or upon Communications Module Init request), the Main Processor would send its complete log contents to the Communications Module 22. At that point, Communications Module log record is identical to that of the Main Processor. Whenever new log data is recorded at the Main Processor, the Main Processor sends the new log record to the Communications Module 22. When log records are deleted from the Main Processor (via, for example, a front panel or data port—not shown), the Main Processor commands the Communications Module 22 to delete its copy of the log record. When the Main Processor reaches, for example, 100 log records of one type or the other, it discards its oldest records when new ones occur. The Main Processor also commands the Communications Module processor and hence memory 62 to discard its corresponding old records.

It is to be understood that many alternate embodiments of the present invention may be practiced without departing from the spirit and scope of the present invention. Accordingly, other methods could be used to implement the expansion accessory handling system. For example, it is not essential that interrupt signals be used for handshaking. Further, all data transfers and acknowledges could alternately be handled via a polling algorithm. Also, the expansion bus could alternatively be a parallel bus design.

As an alternative to having pre-defined addresses for Expansion Accessory Devices, the present invention may be implemented such that the Main Processor polled each serial bus address and ascertained what type of device resided at each location.

The preferred embodiment of the invention has been described in detail herein, and various modifications, enhancements and improvements which do not depart from the scope and spirit of the invention will become apparent to those of skill in the art. Thus, it should be understood that the preferred embodiment has been provided by way of example and not by way of limitation. The scope of the invention is defined by the appended claims.

What is claimed is:

1. A controller for a voltage regulator, the controller, having automatic configuration of an accessory device, comprising:

a voltage regulator controller including a main processor having at least a first I/O section and a first peripheral interface section for communication with at least one accessory device;

said at least one accessory device being electrically detachably connected to said voltage regulator controller, said accessory device having an accessory device processor therein and having at least a second I/O section and a second peripheral interface section for communication with said main processor;

wherein said voltage regulator controller interrogates and exchanges data with said at least one accessory device through said main processor and said accessory device processor using point to point communications, said main processor being a communications master and said accessory device processor being a communications slave responsive to said communications master.

2. A controller according to claim 1 wherein said at least one accessory device is comprised of a communication module.

3. A controller according to claim 1 wherein said at least one accessory device is comprised of a data logger.

4. A controller according to claim 1 wherein said at least one accessory device is comprised of an I/O module.

5. A controller according to claim 1 wherein said main processor configures said accessory device processor according to a predetermined scheme.

6. A controller according to claim 1 wherein said at least one accessory device has stored therein an accessory device configuration and said accessory device transmits to said main processor said accessory device configuration.

7. A controller according to claim 1 wherein said first peripheral interface section and said second peripheral interface section are each comprised of a respective signal interface disposed between said main processor and said accessory device processor, each of said signal interfaces having at least one signal line.

8. A controller according to claim 1, wherein said main processor communicates with said accessory device processor using at least one of i) a polling mode and ii) a broadcast mode.

9. A controller according to claim 1, wherein said main processor interrogates said accessory device processor as a result of at least one of a power-on-reset of the voltage regulator controller and a request from the accessory device.

10. A controller according to claim 9, wherein said power-on-reset of the voltage regulator controller is provided to said accessory device via a dedicated signal line.

11. A controller according to claim 9, wherein said power-on-reset sends at least one of i) accessory device initialization data and ii) accessory device internal configuration data from said main processor to said accessory device processor.

12. A controller according to claim 11, wherein said accessory device initialization data includes complete log contents of said main processor.

13. A controller according to claim 1, wherein said first peripheral interface section of said main processor communicates with said second peripheral interface section of said accessory device by converting said data into a predefined format before said main processor exchanges said data with said accessory device processor.

14. A controller according to claim 13, wherein object data from said main processor to said accessory device processor is converted into a plurality of data fragments prior to transfer of said object data to said accessory device processor.

15. A controller according to claim 13, wherein said pre-defined format is a queued serial peripheral interface (QSPI) data link format.

16. A controller according to claim 1, wherein said first peripheral interface section of said main processor communicates with said second peripheral interface section of said accessory device via a serial communications link.

17. A controller according to claim 16, wherein said serial communications link is a full-duplex serial communications link.

18. A controller according to claim 16, wherein said communication between said first peripheral interface section of said main processor and said second peripheral interface section of said accessory device processor is comprised of at least one message, said message having a 16 word message packet.

19. A controller according to claim 1, wherein said accessory device has a predefined address.

20. A controller according to claim 1, wherein said accessory device is polled by said main processor to determine a device type of said accessory device.

21. A controller according to claim 1, wherein said main processor reinitializes said accessory device responsive to at least one of i) a power-on-reset, ii) a request from said accessory device processor, and iii) a communications error detected by said main processor.

22. A voltage regulator controller for a voltage regulator according to claim 21, wherein said reinitialization resets the configuration and log data of said accessory device.

23. A voltage regulator controller for a voltage regulator according to claim 1, wherein said main processor transfers a data log to said accessory device during one of i) power-on-reset and ii) request from said accessory device.

24. A controller according to claim 1, wherein said main processor sends a new log record to said accessory device processor responsive to said new log record being recorded in said main processor.

25. A controller according to claim 24, wherein said main processor further includes a memory and said main processor stores said new log record according to a respective sequence number in said memory.

26. A controller for a voltage regulator, the controller, having automatic configuration of an accessory device, comprising:

a voltage regulator controller including a main processor, said main processor having at least an I/O section and a first peripheral interface section for communication with at least one accessory device; and said at least one accessory device being electrically detachably connected to said voltage regulator controller, said accessory device having an accessory device processor therein and having at least an I/O section and a second peripheral interface section for communicating with said main processor and wherein said main processor interrogates and exchanges data with said accessory device through said accessory device processor with point to point communications, and wherein said accessory device is at least one of the group consisting of i) a communication module, ii) a data logger and iii) an I/O module;

wherein said voltage regulator controller configures said accessory device processor according to a predetermined command set, said accessory device having stored therein an accessory device configuration and wherein said accessory device transmits to said main processor said accessory device configuration and said first peripheral interface section and said second peripheral interface section each includes a respective signal interface disposed between said main processor and said accessory device processor, said signal interfaces each having at least one signal line therein; and said main processor being a communications master and said accessory device processor being a communications slave responsive to said communications master.

27. A controller according to claim 26, wherein said predetermined command set includes at least one of:

i) a write non-log data command, ii) a write log data command, iii) a write function command, iv) a hardware reset command, v) a communications module present command, vi) a load communications module configuration command, and vii) an object reset command.

28. A controller according to claim 26, wherein said accessory device responds to said predetermined command set with at least one of:

i) a write non-log data response, ii) an object reset response, iii) a master object reset response, iv) a communications module present response, and v) an initialization complete response.

29. A method of configuring an accessory device upon electrical connection to a voltage regulator controller, wherein said accessory device and said voltage regulator controller each have a processor having a respective I/O section and a respective peripheral interface section, comprising the steps of:

A. initializing the accessory device processor by the main processor; and

B. writing configuration data transmitted by the main processor to the accessory device through the accessory device processor such that said accessory device operates according to a predetermined command set and a point to point communications protocol.

* * * * *